United States Patent [19]

Altmann et al.

[11] 3,945,088
[45] Mar. 23, 1976

[54] SPACER STRIP, ESPECIALLY FOR ELECTRICAL HEATING MATS

[75] Inventors: Dieter Altmann, Gruendau-Lieblos; Eberhard Haupt, Gruendau-Rothenbergen, both of Germany

[73] Assignee: Firma Wilhelm Haupt, Rothenbergen, Germany

[22] Filed: Dec. 6, 1974

[21] Appl. No.: 530,207

Related U.S. Application Data

[62] Division of Ser. No. 389,566, Aug. 20, 1973, Pat. No. 3,874,910.

[30] Foreign Application Priority Data

Aug. 22, 1972 Germany.............................. 2241201
Sept. 18, 1972 Germany............................ 2245742

[52] U.S. Cl.............................................. 24/81 CC
[51] Int. Cl.²........................................... A44B 21/00
[58] Field of Search ........ 24/81 CC, 16 PB; 206/72; 219/46, 532, 537

[56] References Cited
UNITED STATES PATENTS

| | | | |
|---|---|---|---|
| 2,228,493 | 1/1941 | Will............................... | 206/72 UX |
| 2,599,059 | 6/1952 | Jones ............................ | 219/46 UX |
| 2,745,942 | 5/1956 | Cohen........................... | 219/537 X |
| 3,013,656 | 12/1961 | Murphy ......................... | 206/72 |
| 3,161,210 | 12/1964 | Lööf.............................. | 24/16 PB UX |
| 3,391,432 | 7/1968 | Du Rocher..................... | 24/81 CC |

*Primary Examiner*—Donald A. Griffin
*Attorney, Agent, or Firm*—Wolfgang G. Fasse; Willard W. Roberts

[57] ABSTRACT

The present spacer strips are used to form, for example, electrically heated mats, whereby the strips hold the elongated heating elements in a fixed position relative to each other. For this purpose the strips are provided with grooves into which the elements are inserted with a press-fit and preferably with an elastically yielding press-fit. The strips are further provided along the ends with coupling means for connecting several strips in series with each other. The present strips are formed by heating thermoplastic sheet material and stretching the sheet material over a grooving tool plate then the sheet is pressed or sucked into the grooves of the tool plate. After cooling and removal of the grooved sheet, the sheet is cut into strips whereby the cut extends substantially across the grooves. Preferably the strips are also provided with further grooves for receiving strap bars, whereby a plurality of strips may be connected in parallel to each other or whereby the strips may be secured to structural members.

10 Claims, 5 Drawing Figures

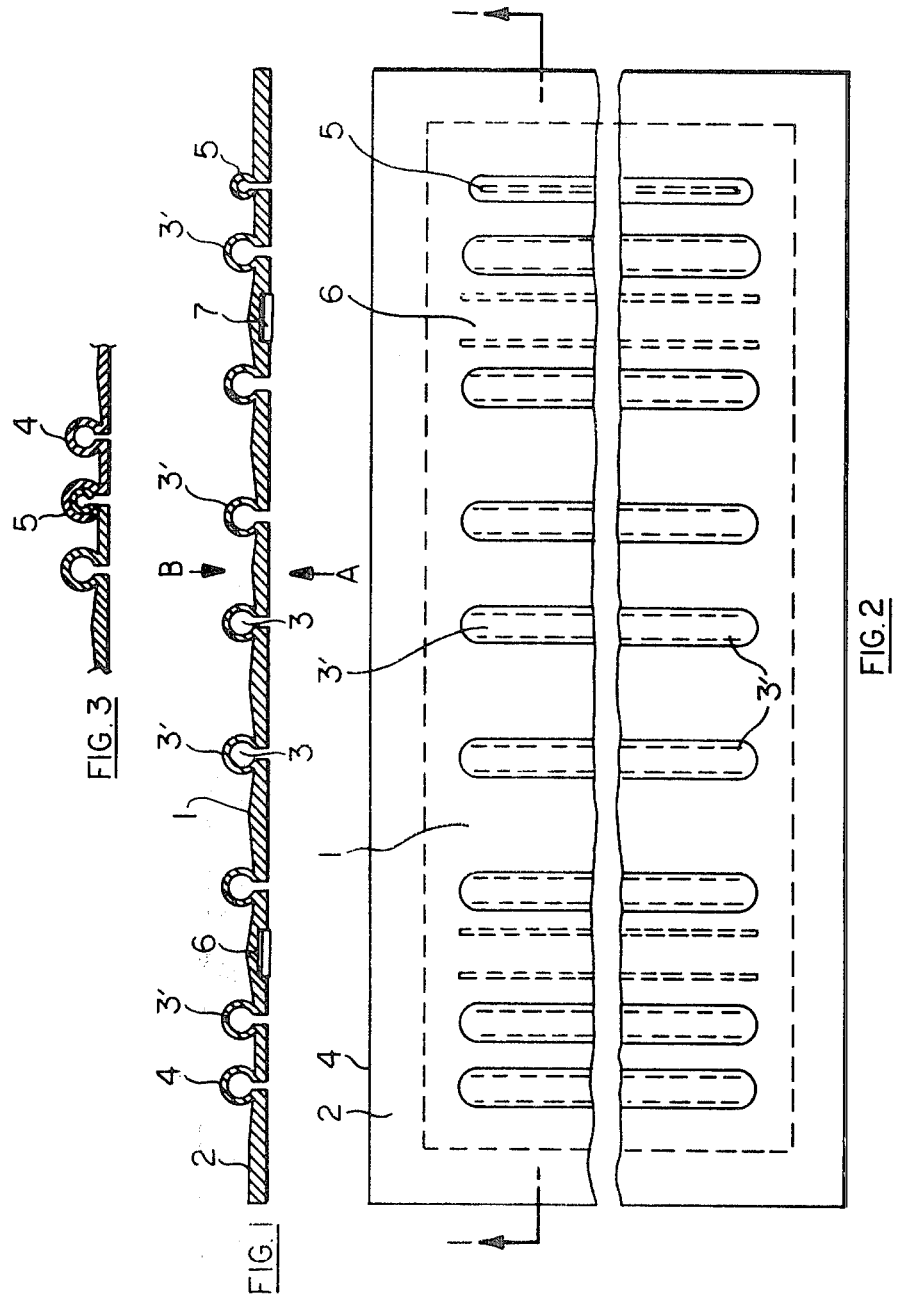

SPACER STRIP, ESPECIALLY FOR ELECTRICAL HEATING MATS

This is a divisional of application Ser. No. 389,566 filed Aug. 20, 1973 and now U.S. Pat. No. 3,874,910.

BACKGROUND OF THE INVENTION

The present invention relates to spacer strips, more specifically to spacer strips used for constructing electrically heated mats. The present invention also relates to a method for economically manufacturing such spacer strips.

German Pat. Application No. P 21 27 567 (laid open on December 14, 1972) discloses electrically heated mats or rather structural elements for the production of such mats. These known mats comprise electrical heating elements in the form of meandering heating loops having legs arranged in parallel to each other wherein these legs are secured to cross bars extending at right angles relative to the longitudinal length of the heating loops. In this fashion, the heating loops and the cross bars form together a grid type mat which may be installed as desired.

The prior art mats as described above permit their production in any desired shape due to said cross bars. Further, the final assembly of the mats, that is, the insertion of the heating conductors into the cross bars may be done depending on the particular circumstances. In other words, the complete mats may be assembled in the work shop, especially where relatively simple heating surfaces are involved. On the other hand, the cross bars also permit an assembly at the construction site, especially where more involved surfaces are to be covered with these heating mats as is frequently the case in hospital rooms or the like.

In addition to the advantage of allowing for the formation of any desired shapes, the heating mats according to the prior art have other advantages. They are easily transported because they may be rolled up or plugged together and so forth. These mats further avoid separating layers in the flooring plaster due to the large mesh grid formation. This feature has the further advantage that the mats may be installed in a single work process.

In a further prior art embodiment means are provided for relieving the heating conductors from a bearing function within the grid arrangement. This relief is accomplished in that the cross bars which secure the heating conductors in position are interconnected with each other by spacing lands extending in the longitudinal direction of the mat or rather in the direction of the heating conductors.

Due to this feature of the prior art heating mats, it is possible to pre-assemble the grid in such a manner that it may be rolled up and that the grid may be cut with due regard to the area to be heated whereupon the heating conductors are simply pressed into the holding means of the cross bars in order to secure the heating conductors in accordance with the shape of the area to be heated. The holding means of the cross bars are arranged at relatively close but equal spacings, whereby sufficient flexibility is provided for rerouting the heating conductors in order to make necessary openings, for instance for wash stands, toilet bowl areas and the like, without causing an unpermissible heat density or heat congestions.

In addition to the above described prior art heating mats, comprising in the one system interconnecting cross bars and in the other system such cross bars in combination with longitudinally interconnecting lands, there are known grid-shaped heating mats wherein the heating conductors are mounted to concrete reinforcing steel grids. In addition, there are known area heating means such as heating pads and electric blankets, wherein the heating conductors are embedded in rather pliable materials such as fabrics or the like.

From the above description of the prior art it is apparent that the cross bars with their holding means for securing the heating conductors or resistors and their structural features are critical for the technical and economical characteristics of the above described two prior art systems. Thus, there is known a first type of cross bars in which the heating resistors or elements are secured in equally spaced slots provided in band or strip material arranged in an upright position, whereby said slots are self-locking. In a second type of cross bars the band or strip material is also provided with slots, however the slots are not self-locking and therefore U-shaped clamping members are used to cover the slots. In a third embodiment the cross bars also comprise a band or strip material, however, in this arrangement the band or strip material is maintained in a flat position and provided with equally spaced three-sided incisions which are preferably located in the center of the flat strip material, whereby tongues are formed which correspond to the cross section of the cable or heating conductor. The just described three basic arrangements may, of course, be modified in many different ways. In any event, the first and second type described above have the disadvantage that their use requires a relatively plain surface for the installation. Further, where spacing lands are employed they must be provided with plug incisions, whereby the whole system is weakened unless additional rather costly connecting means are employed, for example, along the angled butt connections, by means of welding or gluing, whereby the welding would involve a fillet weld or joint.

The third type of interconnection described above has the disadvantage that the making of said incisions also involves a rather technical effort, whereby the formation of said tongues usually requires the application of heat.

OBJECTS OF THE INVENTION

In view of the foregoing, it is the aim of the invention to achieve the following objects singly or in combination:

to remove the drawbacks of the prior art, more specifically to provide a method for the simple and economical production of the cross connecting elements or spacer strips for electrical heating grids, whereby the spacer strips are to extend in a flat position for the securing of the heating resistor elements;

to provide spacer strips which will easily permit the rolling up of the heating mats, whereby the spacer strip will form part of a supporting grid structure of the heating mats which may have any desired shape;

to provide spacer strips which may be easily interconnected with each other in series to form mats of any desired width and which strips may also be easily connected in parallel to each other to form mats of any desired length, without interferring with the desirable roll up feature of the mats for their easy transport;

to provide interconnecting means for electrical heating mats which make these mats highly adaptable to the individual requirements of any heating problem;

to facilitate the installation at the building site, as well as the assembly in the shop, regardless how many individual widths of heating mats are to be interconnected;

to provide heating mats which are easily adaptable to surfaces to be heated which are not plain or where the heating mat must cover a curved surface;

to provide interconnecting cross spacer strips for heating mats which will facilitate the parallel installation of several mats to form heating surfaces of rather large widths; and to provide spacer strips with self-locking slots or grooves for the heating elements which slots or grooves will assure the proper relative positioning of the heating elements, even where the mat must be installed so as to negotiate a curve.

SUMMARY OF THE INVENTION

According to the invention there is provided a method for producing spacer strips, especially for electrically heated mats or the like by deforming thermoplastic sheet material, such as polyethylene, preferably in a deep drawing process in such a manner that the sheet material is provided with element receiving grooves which are preferably equally spaced from each other. The cross section of the grooves corresponds substantially to the cross section of the heating elements. Subsequent to the deformation the sheets are cut into strips, substantially in a direction extending across the longitudinal extension of the grooves, whereby the grooves extend across the spacer strips with open ends.

The method according to the invention is rather economical and has the additional advantage that the heating elements may be secured in exact positions relative to each other, whereby each securing element has the same shape and thus provides the same uniform clamping action. Another advantage of this method is seen in that the width of the spacer strips may be selected in accordance with any particular requirements. Thus, narrow or wide strips may be cut from the same sheet without the need for additional tools or the like.

The spacer strips according to the invention comprise the element receiving grooves, preferably in the shape of open faced loops which are equally spaced from each other, except at the end of the strip where a coupling means, for example a loop of smaller diameter, is spaced from the next adjacent groove by about one half of the normal spacing between adjacent grooves. The smaller loop fits into the groove of the loop of the next adjacent spacer strip, whereby a plurality of spacer strips may be connected in series with each other. This feature of the invention has the advantage that the heating mats may be extended as desired.

Further, the present spacer strips are provided with additional grooves for the securing of spacer lands, all of which may have the same length or they may have different length and different shapes. The spacer lands in the additional grooves make it possible to strengthen the entire grid structure in accordance with the individual static requirements thus providing a grid structure which is independent of the static characteristics of the individual heating conductors. Moreover, these spacer lands make it possible due to their different length and/or shape, to arrange the heating mat in such a manner that it deviates from a straight line in any desired direction.

BRIEF FIGURE DESCRIPTION

In order that the invention may be clearly understood, it will now be described, by way of example, with reference to the accompanying drawings, wherein FIG. 1 illustrates a sectional view through the sheet material provided with the grooves according to the invention, said section extending substantially along line 1—1 in FIG. 2;

FIG. 2 illustrates a plan view onto a sheet of thermoplastic material provided with the grooves according to the invention but prior to the cutting operation;

FIG. 3 illustrates a view similar to that of FIG. 1 and shows the coupling of two spacer strips in series with each other;

DETAILED DESCRIPTION OF EXAMPLE EMBODIMENTS

Figure 4:
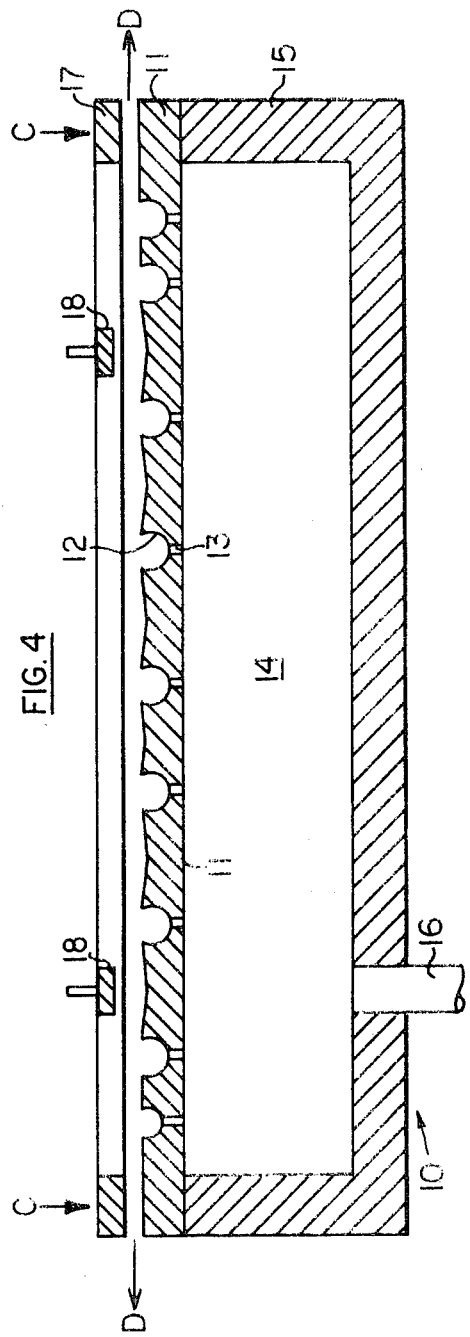
FIG. 4 is a schematic sectional view through a tool for forming the thermoplastic sheets in accordance with the present method.

FIG. 2 illustrates a rear plan view onto a thermoplastic sheet or panel 1, as viewed in the direction of the arrow B in FIG. 1. The margin 2 of panel 1 is clamped onto a tool plate, as will be described in more detail below with reference to FIG. 4. The first step of the method according to the invention comprises forming the loops 3' into the sheet of thermoplastic material such as polyethylene. The loops define grooves 3 adapted to receive the electrical conductors of the electrically heated mat.

Simultaneously with the formation of the loops 3' additional grooves 6 may be formed into the body of the strip material. These grooves 6 are adapted to receive connecting spacer lands 7 as illustrated in FIGS. 1 and 5.

The spacings between adjacent loops along the length of each spacer strip are approximately equal to each other, except for the spacings between the last two loops 4 and 5. It will be noted that the loop 5 is smaller in size than the remaining loops. This feature makes it possible to couple several spacer strips to each other in series as illustrated in FIG. 3. For this purpose, the marginal portions adjacent to the loop 4 and adjacent to the loop 5 are removed from the spacer strips. By spacing the loops 4 and 5 from the next adjacent loop 3' approximately one half the normal spacing between the loops 3', it is possible to interconnect adjacent spacer strips without any interruption in the even distribution of the heating elements.

Figure 5:
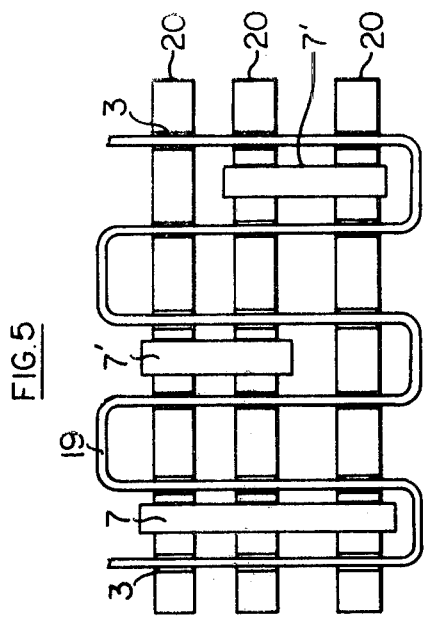
FIG. 5 is a schematic plan view of a mat, according to the invention and as viewed in the direction of the arrow A in FIG. 1

After the formation of the loops 3' the sheets are removed from the tool plate and cut into strips as best seen in FIG. 5. These strips may have any desired width depending on the required structural rigidity of the finished mats.

Referring to FIG. 4, there is shown a tool 10 having a tool plate 11, the top surface of which is provided with grooves 12 in the shape of the loops to be formed. These grooves 12 in the tool plate 11 are connected through channels 13 to a space 14 in a housing 15 which may, for example, be evacuated through a port 16. The tool comprises a clamping frame 17 which clamps the edges 2 of the panel 1 down onto the tool plate 11 in the direction of the arrows C. The details of the clamping means are well known in the art.

If desired, the sheet may be stretched outwardly prior to applying the clamping frame 17. The stretching could be accomplished by hand or other well known means, in order to smooth out the sheet or panel in the direction of the arrows D all around the tool plate. In order to form the grooves 6 simultaneously with the loops 3', there are provided respective tool members 18 which are movable up and down by well known means, for example, by a piston cylinder arrangement.

Incidentally, the panel 1 is not shown in FIG. 4 for simplicity's sake. After the panel has been clamped down in the manner shown, the temperature of the panel will be raised by means not shown but well known in the art in order to facilitate the flow of the panel material into the grooves 12 of the tool plate 11. After the panel 1 has reached the desired temperature or flowability, a pressure may be applied, for example, by a tool member lowered from above onto the panel 1. However, the preferred embodiment of practicing the present method involves applying a reduced pressure to the space 14, whereby the panel will be sucked into the grooves 12. From the shape of the loops 3' and the interconnecting strip portions between adjacent loops it will be noted what deforming work has been done on the thermoplastic sheet material.

After the completion of the deformation the sheet material is cooled down again and the sheet will deform sufficiently in an elastic manner to remove the loops 3' from the grooves 12. Thereafter, the cutting takes place preferably in a direction extending perpendicularly to the longitudinal extension of the loops 3'.

FIG. 5 illustrates a somewhat schematic plan view of a heating mat according to the invention, whereby the view is in the direction of the arrow A in FIG. 1, that is onto the open faced grooves 3 which receive the electrical conductor 19, preferably in a press-fit or snap-fit manner, whereby these conductors are securely held in the grooves 3. The spacer strips 20 may have any desired width and several of these strips may be connected to each other by the spacer lands 7 or 7' which fit into the relatively shallow grooves 6 shown in FIG. 1. Here again a press-fit between the grooves 6 and the spacer lands 7 or 7' would be preferred. The spacer lands 7, 7' may have any desired length or shape and they may be distributed throughout the entire mat in any desired fashion. This feature has the advantage that the mat may be shaped to cover curved areas to be heated.

A practically suitable dimension of standard stock panels, for example, of polyethylene material was 1,000 × 600 mm, and the grooves where spaced from each other by 25 mm. This panel was then cut into spacer strips having a width of 10 mm.

The present spacer strips will preferably be used as cross strips extending across the length of the heating mat. However, they may also be used as longitudinal connecting strips, whereby also a sufficient stability is achieved due to the secure connection between the spacer strips and the heating elements so that undesirable deformations of the mat may be avoided.

Although, in the preferred embodiment the loops have an omega shape, it will be appreciated that any type of groove shape suitable to assure said press or snap-fit may be employed for securely receiving the electrical heating conductors.

Although, the invention has been described with reference to specific example embodiments, it is to be understood that it is intended to cover all modifications and equivalents within the scope of the appended claims.

What is claimed is:

1. A spacer strip for holding elongated elements in spaced relationship to each other, comprising a strip body of elastic thermoplastic material, a plurality of substantially equally spaced apart open sided element receiving grooves in said strip body, said grooves extending substantially across said strip body, and coupling means across at least one end of the strip body for interconnecting a plurality of strip bodies in series with each other, said coupling means being spaced a distance from the adjacent groove that is substantially equal to half the distance between adjacent grooves.

2. The spacer strip according to claim 1, wherein said coupling means comprise a bead or ridge along said one end of the strip body, said bead or ridge being of a size to fit with a press-fit into a groove of the size of said element receiving grooves along an end of an adjacent strip.

3. The spacer strip according to claim 2, wherein said open sided element receiving grooves have the cross-section of a loop, whereby a plurality of loops interconnect adjacent lands of the strip body.

4. The spacer strip according to claim 3, wherein said open sides and the respective grooves are sized to receive said elements with a press-fit.

5. The spacer strip according to claim 4, wherein all of said open sides face in the same direction.

6. The spacer strip according to claim 3, further comprising a coupling groove of the same size as said element receiving grooves along the other end of the strip body whereby the spacing between said coupling groove and the next adjacent element receiving groove corresponds to about one half of the spacing between adjacent element receiving grooves.

7. The spacer strip according to claim 6, wherein said coupling bead or ridge comprises a loop of smaller size than the other loops, said smaller loop fitting into the loop or normal size along an end of an adjacent spacer strip body.

8. The spacer strip according to claim 6, wherein said coupling groove has the cross section of a loop with the open side thereof being on the same side of said strip as the open sides of said element receiving grooves.

9. The spacer strip according to claim 1, further comprising, in addition to said open sided element receiving grooves, attachment grooves for receiving strap bars in said attachment grooves.

10. The spacer strip according to claim 9, wherein said attachment grooves and said element receiving grooves face in the same direction.

* * * * *